(12) United States Patent
Korneluk et al.

(10) Patent No.: US 7,330,727 B2
(45) Date of Patent: Feb. 12, 2008

(54) METHOD OF DETERMINING CO-LOCATION OF CELL SITES AND REDUCING PING-PONG EFFECT BETWEEN CELL SITES

(75) Inventors: Jose E. Korneluk, Boynton Beach, FL (US); Robert H. Pichette, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 671 days.

(21) Appl. No.: 10/430,245

(22) Filed: May 6, 2003

(65) Prior Publication Data

US 2004/0224696 A1 Nov. 11, 2004

(51) Int. Cl.
*H04Q 7/20* (2006.01)
(52) U.S. Cl. ...................... 455/438; 455/436; 455/439; 455/440
(58) Field of Classification Search ................ 455/446, 455/449, 422.1, 456.1, 457, 562.1, 442, 439, 455/440, 444, 437, 438, 436
See application file for complete search history.

(56) References Cited

U.S. PATENT DOCUMENTS 5,960,341 A * 9/1999 LeBlanc et al. ......... 455/426.1

| 6,285,874 | B1 * | 9/2001 | Magnusson et al. ...... 455/456.1 |
| 6,970,708 | B1 * | 11/2005 | Raith .......................... 455/440 |
| 7,110,766 | B1 * | 9/2006 | Tayloe et al. ................ 455/438 |
| 2003/0119501 | A1 * | 6/2003 | Kim ............................ 455/433 |
| 2004/0097234 | A1 * | 5/2004 | Rajkotia et al. ............ 455/442 |

* cited by examiner

*Primary Examiner*—Barry Taylor

(57) ABSTRACT

A method for determining the co-location of cell sites includes the steps of acquiring a neighbor cell list (602), monitoring the neighbor cell sites for longitude and latitude information (604). Te longitude and latitude information is used of calculating the distance and bearings between the serving and neighbor cell sites (606 and 608). Neighbor cell sites having similar bearing and distances are grouped together (610), if grouped neighbors are in close proximity, the centroid of a polygon formed by the sector vertices is determined (614) and new latitude and longitude information for the centorid is determined (616). The neighbor cell list is then modified to indicate sectored versus omnidirectional sites (620) and the information is then used by the communication device to make better mobility decisions. In another embodiment of the invention, the co-location information is used to minimize ping-pong effect which causes a communication device to be continually being handed back and forth between ell sites.

13 Claims, 4 Drawing Sheets

METHOD OF DETERMINING CO-LOCATION OF CELL SITES AND REDUCING PING-PONG EFFECT BETWEEN CELL SITES

TECHNICAL FIELD

This invention relates in general to the field of radio communications, and more specifically to a method for determining the co-location of cell sites and also for using the co-location information to minimize ping-pong effect between neighboring cell sites.

BACKGROUND

Typical radio communication systems include sectored and omni-directional cell sites as shown in FIG. 1. Communication system 100 includes a plurality of cell sites A-F and a communication device such as a portable radio (e.g., cellular telephone, etc.) 102 is shown operating within the communication system. Cell sites A-D and G are omni-directional cell sites, while cell sites E and F are shown as sectored cell cites.

In a typical prior art communication system such as system 100, the communication device 102 has no knowledge if a given cell site is an omni-directional or sectored cell site since this information is not provided to the portable radio 102. Not having this cell site information hinders the ability of the portable radio 102 from making informed mobility management decisions such as when dealing with cell site handovers, etc.

Another problem encountered in communication systems is referred to as the "ping-pong" effect that is caused when a communication device is repeatedly handed over between two cell sites. This ping-pong effect typically occurs when a communication device is operating within the coverage boundaries of two sites of a sectored cell site or between two overlapping cell coverage areas, such as between sectors 1 and 2 of cell site E of communication system 100. A need thus exists in the art for a method that can provide for a solution to these problems.

BRIEF DESCRIPTION OF THE DRAWINGS

The features of the present invention, which are believed to be novel, are set forth with particularity in the appended claims. The invention may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
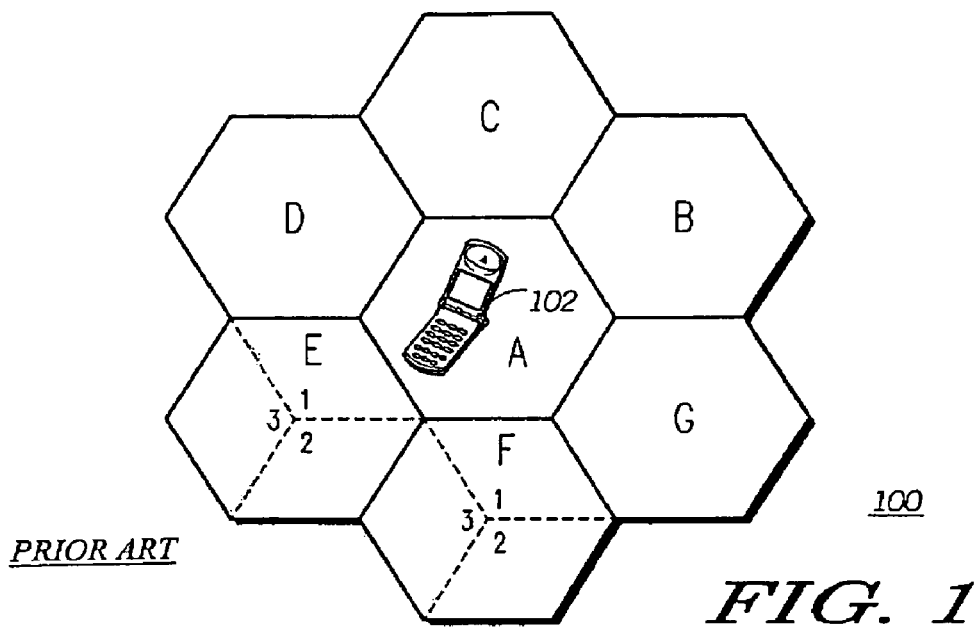
FIG. 1 shows a prior art wireless communication system.

While the specification concludes with claims defining the features of the invention that are regarded as novel, it is believed that the invention will be better understood from a consideration of the following description in conjunction with the drawing figures.

With communication systems, such as the Integrated Digital Enhanced Network (iDEN®) radio communication system manufactured by Motorola, Inc., newer releases of the infrastructure software allow for communication devices operating within the communication to receive latitude and longitude information of the serving cell site.

This latitude and longitude information is transmitted over the Broadcast Common Control Channel (BCCH). This information allows the communication device to discern the geographical location of the serving cell site to a high degree of accuracy.

Figure 2:
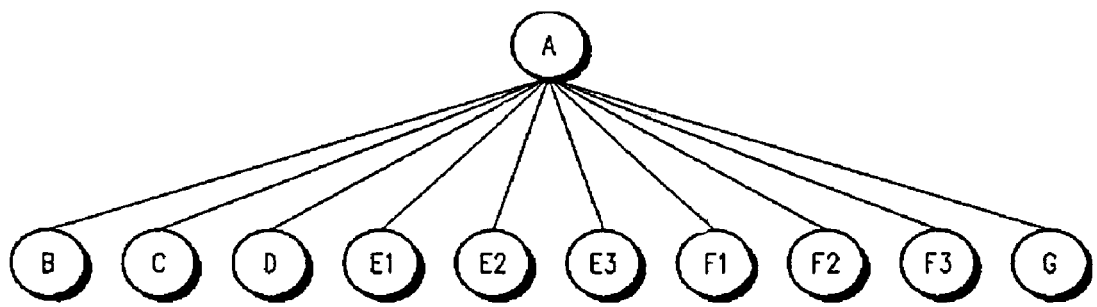
FIG. 2 shows a diagram of a neighbor cell site list for cell site "A" in accordance with an embodiment of the invention.
Figure 3:
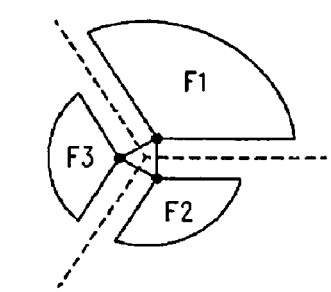
FIG. 3 shows a diagram the physical sectored cell site layout of cell site "F" in accordance with an embodiment of the invention.

Referring now to FIG. 2, there is shown a neighbor cell list of cell site A which is referred to as the current serving cell site for the communication device 102. The communication device 102 affiliated with serving cell site A will have neighbors B through G in its neighbor cell list. In FIG. 1, a sectored cell site such as cell sites E and F are shown as three 120-degree arcs emanating from an ideal point source in the center of a hexagonal cell. In real-world implementations, the sectored antennas are spaced apart whether mounted on a tower or on the face of a building, thus creating an area in between them. In FIG. 3, there is shown a possible physical layout for cell site F.

In accordance with the preferred embodiment of the invention, a communication device monitors the location information such as the latitude and longitude information for each cell site on the neighbor cell site list that is broadcast over the BCCH in an iDEN™ communication system or other channel in other types of communication systems. This information is then used to calculate the distance and direction bearings between the serving cell site and each of the neighbor cell sites to determine whether the neighbor cell sites are located in such close proximity that they form a sectored cell sites like cell sites E and F shown in FIG. 1. Like-neighbors that have similar direction bearings and are located similar distances from the serving cell site are grouped together. Then, distances between each of the neighbor cell sites that have been grouped together are calculated. If these distances are below a given distance threshold limit, the grouped cell sites are considered as being part of a sectored site (e.g., cell site E or F).

Figure 4:
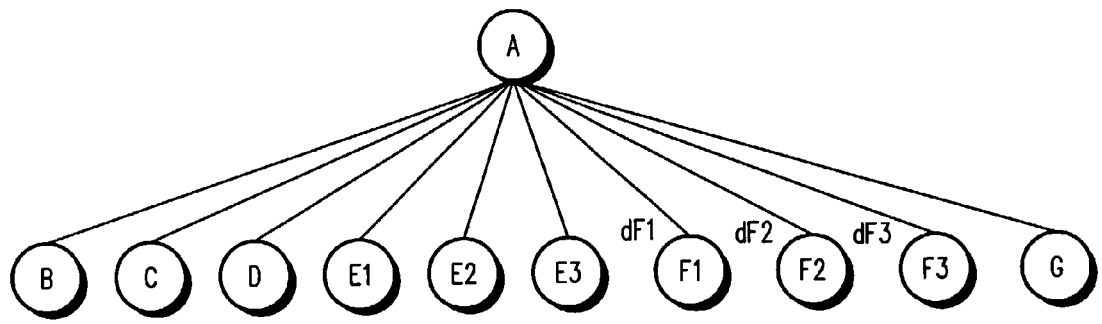
FIG. 4 shows a diagram highlighting the calculated distances between cell site "A" and the different sectors "F1", "F2" and "F3" of cell site "F" in accordance with an embodiment of the invention.

Referring to FIG. 4, distance calculations between serving cell site A and the sectored cell site F, with each of the three sectors denoted as F1, F2 and F3 are shown. The distances between the serving cell site A and F1 is denoted as dF1, between A and F2 the distance is denoted as dF2, and the distance between A and F3 the distance is denoted as dF3. The communication device operating within the communication system is able to calculate the geographical distances between the serving cell site and its neighbors to a high degree of accuracy based on the broadcasted latitude and longitude information since in a communication system such as the iDEN communication system, cell sites are spaced on average in excess of 30 kilometers apart.

The distance criteria that is used to determine which neighbor cell sites are grouped together can be in the range of feet to tens or even hundreds of feet. This predetermined threshold can be stored in the communication device and can be dynamically reprogrammed over-the-air if required. Alternatively, this information can be sent to the communication device by the communication system. Depending on the specific system requirements, the threshold distance by which cell sites are decided to be grouped together (to determine which cell sites are sectored sites), will depend on factors such as how closely the cell sites (omni-directional and sectored) are spaced apart, etc.

Figure 5:
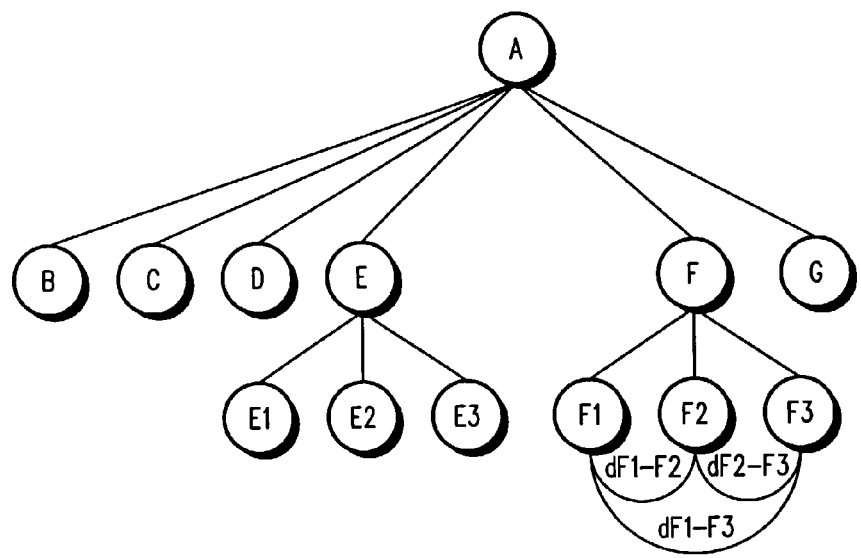
FIG. 5 shows a diagram of a neighbor cell list for cell site "A" after sectoring in accordance with an embodiment of the invention.

As mentioned, if the cell sites are determined to be close together (within the predetermined threshold limit), then they are grouped together as a sectored site. This operation is then repeated for the remaining neighbors in the neighbor cell list. After "sectoring" is determined, the neighbor cell list will be modified a shown in FIG. 5. In FIG. 5, cell sites E and F are shown as being sectored and the distances between the F sectors are represented (sectored cell site E would have the same distances calculated). The distance between sector F1 and F2 is calculated as dF1–F2, the distance between sector F2 and F3 is calculated as dF2–F3, and the distance between F1 and F3 is calculated as dF1–F3.

After determining which neighbor cells are sectored together, the center of gravity or centorid of the polygon (see FIG. 3) formed by the vertices of each of the sectors of a sectored site is calculated. After the centorid is determined, a new latitude/longitude is calculated that corresponds to the centorid of the sectored site (e.g., cell site E and F) and is stored in the communication device for future use along with the modified neighbor cell list.

Figure 6:
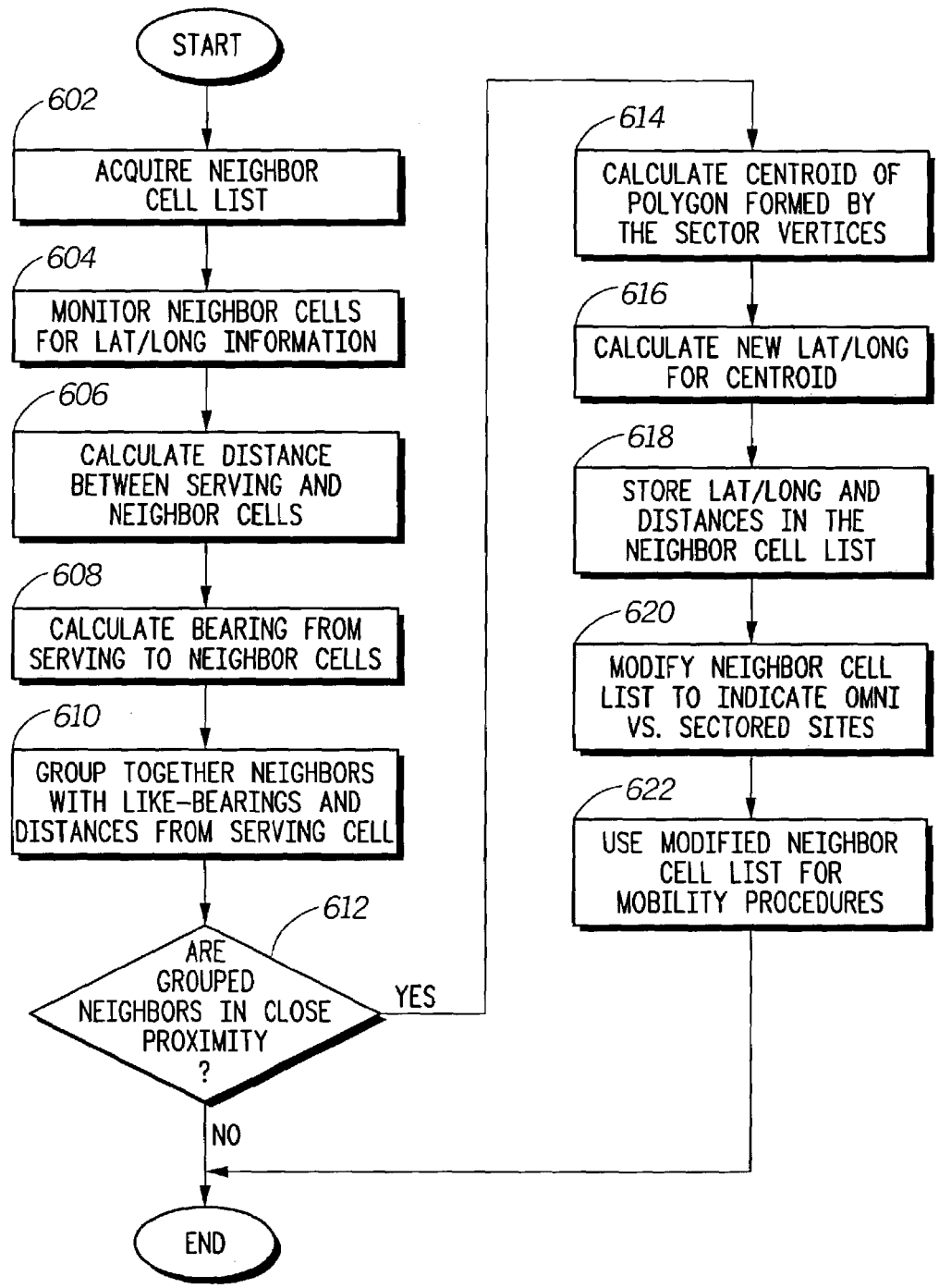
FIG. 6 shows a flowchart highlighting the steps taken in determining the cell co-location of cell sites in accordance with an embodiment of the invention.

In FIG. 6, there is shown a flow chart highlighting the steps taken in accordance with one embodiment of the invention. In step 602, a communication device such as a portable radio operating within the communication system acquires the neighbor cell list information from its currently servicing cell site. The communication device in step 604 then monitors the neighbor cells for latitude/longitude information. In step 606, the distances between the serving cell site and each of the neighbor cell sites is determined. Bearing information is then determined in step 608. In step 610, the neighbor cell sites with "like-bearings" and distances from the servicing cell site are grouped together, since this information may indicate that they are part of a sectored site.

In decision step 612, it is determined if the grouped neighbors are in close proximity, close proximity means they are no more than a predetermined distance away from each other. If it is determined in step 612, that the grouped neighbors are in close proximity, in step 614, the centroid of the polygon formed by the sectored vertices is calculated. In step 616, a new latitude and longitude is calculated for the centorid. This latitude/longitude information and distance information is then stored as part of the neighbor cell list in step 618. In step 620, the neighbor cell list is modified to indicate omni versus sectored cell sites. Finally, in step 622, the modified neighbor cell site list is used by the communication device to make future mobility decisions such as deciding which cell site the communication device should be handed off to next.

The location information determined above can also be used to reduce the "ping-pong" effect typically experienced between neighbor cells based on the location information in accordance with another embodiment of the invention. Upon affiliation to a new cell site when the neighbor cell list is acquired by the communication device operating within the communication system, it is determined if a neighbor cell site is a omni-directional cell site or a sectored cell site using the technique previously described above. Using this information, the neighbor cell site list is modified to place the strongest or nearest site of a sectored site on the foreground and place the two or more weakest or furthest sites of a sectored site on the background, in order to reduce the possibility of "ping-ponging" (handed-off continuously) between two sectors of a sectored cell site.

Figure 7:
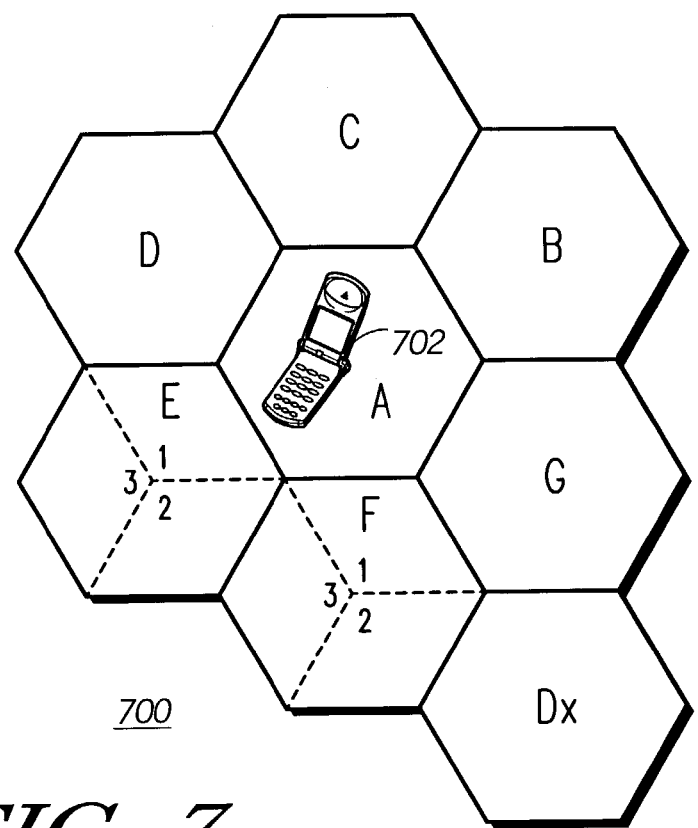
FIG. 7 shows a prior art communication system.

A typical communication system is shown in FIG. 7, composed of both omni-directional cell sites A-D, G and Dx and sectored cell sites E and F. When a communication device 702 affiliates to a new cell site (via handover, reselection, or any other event) such as cell site A, a new neighbor cell list is provided by the serving cell site, similar to that shown in FIG. 2 but including additional cell site Dx. The neighbor cell list is then divided into foreground and background neighbors based on the visibility, signal strength, etc. Foreground neighbors thus become candidates for handover. A sectored site usually has the other two sectors in the neighbor cell list, and if all sectors or multiple sectors are visible from the serving cell site, they will be placed in the foreground. This is compounded by the fact that the communication device does not know that E and F are sectored sites.

Figure 8:
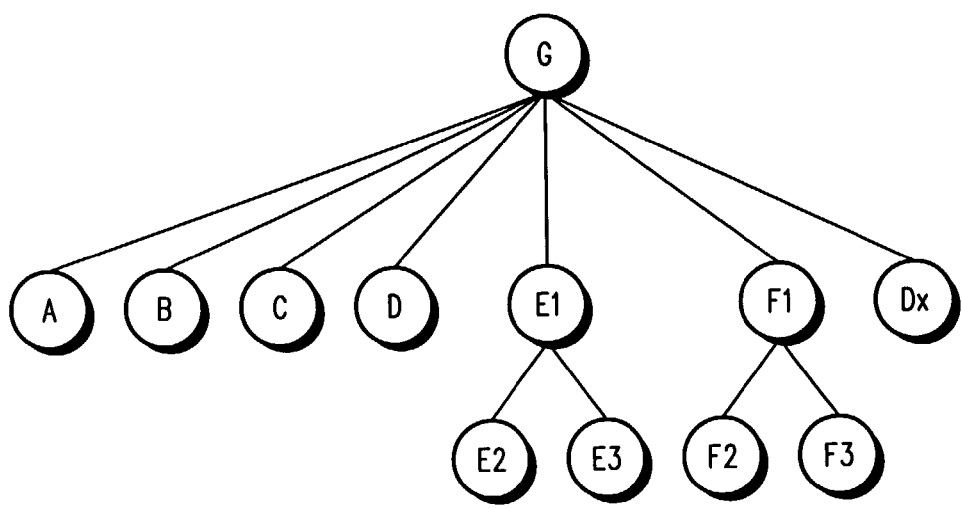
FIG. 8 shows a diagram of a modified neighbor cell list for site "G" of the communication system shown in FIG. 7 in accordance with one embodiment of the invention.

As the communication device 702 moves from cell site A to F, to G and possibly Dx, it may experience "ping-ponging" effects on the boundary sites F and F, and G and D. This is due to having both sectors F1 and F2 in the foreground of the neighbor cell site list, since this is the information that the communication device 702 uses to make mobility decisions. Using the ping-pong reduction technique of the present invention, after sectoring is determined using the technique discussed in the flowchart of FIG. 6, the strongest or nearest site of a sectored site is placed in the foreground of the neighbor cell site list, and the weakest or furthest sites of a sectored site (e.g., cell sites E and F) are placed in the background of the neighbor cell site list as shown in FIG. 8. In this example, sites E1 and F1 are placed in the foreground and the other sites E2, E3, F2 and F3 are placed in the background of the neighbor cell site list. Because the neighbor cell site list has been modified to place the weakest and/or furthest sites of a sectored site on the background (or lower level) of the neighbor cell site list the possibility of ping-ponging effect between two sectors (e.g., F1 and f2) as the communication device moves from site A to F, to G, etc. is reduced.

As been described above, the present invention provides a method for determining the co-location of cell sites in order to determine which sites are part of sectored sites in order for a communication device to make better mobility decisions while operating within a communication system. In another embodiment of the invention, the co-location information is used to reduce the ping-ponging effects by placing only one site of a sectored site in the foreground of the neighbor cell site list used by the communication device, and placing the other sites of a sectored site in the background or lower level of the neighbor cell site list.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims. For example, although the preferred embodiment has discussed in view of dispatch calls between only two parties, more than two participants can be involved in the dispatch calls and the present invention can still be applicable.

What is claimed is:

1. A method for determining the co-location of cell sites in a communication system by a communication device located in a serving cell site, the method comprising the steps of:
   (a) acquiring a neighbor cell site list at the communication device, the neighbor cell site list identifying neighbor cell sites of the serving cell site;
   (b) monitoring the neighbor cell sites for latitude and longitude information;
   (c) calculating the distance and directional bearings between the serving cell site and the neighbor cell sites;
   (d) grouping together neighbor cell sites having similar bearings and distances from the serving cell site together in the neighbor cell site list, where the similar bearings and distances indicate that the grouped cell sites are sectors of a single base site; and
   (e) calculating a centroid of a polygon formed by sector vertices of each of the neighbor cell sites that are grouped together in step (d).

2. A method as defined in claim 1, further comprising the step of:
   (f) calculating a latitude and longitude for the centroid determined in step (e).

3. A method as defined in claim 2, further comprising the step of:
   storing the latitude and longitude and distances in the neighbor cell site list.

4. A method as defined in claim 3, further comprising the step of:
   modifying the neighbor cell site list to indicate omni-directional and sectored cell sites.

5. A method as defined in claim 4, wherein the modified neighbor cell site list is stored in the communication device.

6. A method as defined in claim 4, further comprising the steps of:
   placing one of the sites in each of the grouped sites in the foreground and the rest in the background of the neighbor cell site list.

7. A method as defined in claim 6, wherein in step (i) the one site placed in the foreground for each of the grouped sites is the site in each of the grouped sites that is nearest the serving cell site.

8. A method as defined in claim 6, wherein in step (i) the one site placed in the foreground for each of the grouped sites is the site in each of the grouped sites that is providing the strongest signal to the communication device.

9. A method as defined in claim 1, wherein in step (d) the cell sites are grouped together if they are no more than a predetermined distance away from each other.

10. A method as defined in claim 9, wherein the predetermined distance information is stored in the communication device.

11. A method for determining the co-location of cell sites in a communication system by a communication device located in a serving cell site, the method comprising the steps of:
    (a) acquiring a neighbor cell site list at the communication device;
    (b) monitoring the neighbor cell sites for latitude and longitude information;
    (c) calculating the distance and directional bearings between the serving cell site and the neighbor cells;
    (d) grouping together neighbor cell sites having similar directional bearings and distances from the serving cell site as sectored cells of a single site;
    calculate the centroid of polygon formed by the sector vertices of the neighbor cell sites that are grouped together in step (d);
    calculate the latitude and longitude for the centroid determined in step (e); and
    modifying the neighbor cell site list to indicate omni-directional and sectored cell sites using the information determined in steps (b)-(f).

12. A method as defined in claim 11, wherein the communication device uses the modified neighbor cell site list to make mobility decisions.

13. A method as defined in claim 11, wherein the latitude and longitude information is provided to the communication device over a control channel.

* * * * *